Oct. 12, 1937.  P. C. MILLER  2,095,672
CAKE PLATE OF MOLDED FIBROUS MATERIAL
Filed March 20, 1936
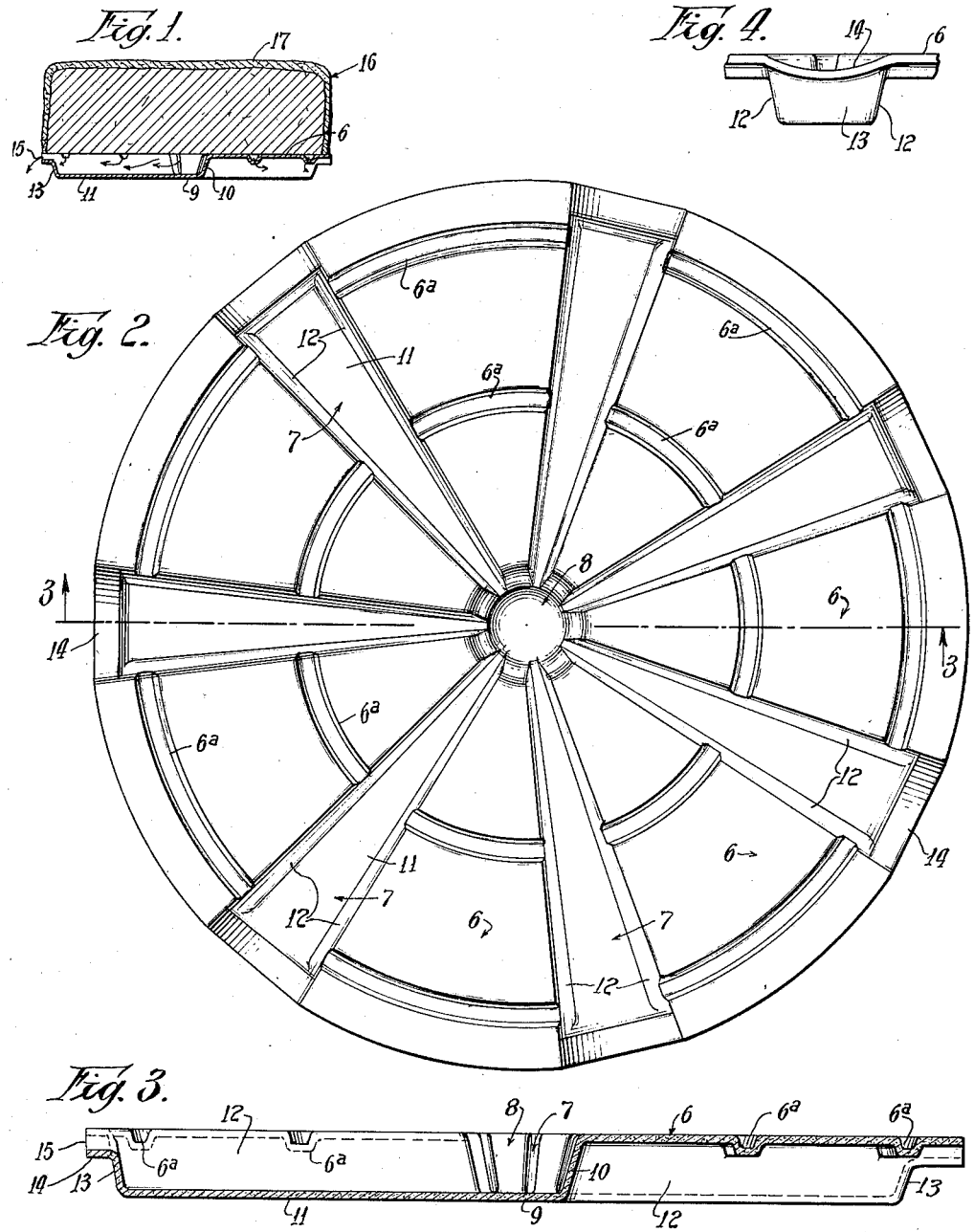

Patented Oct. 12, 1937

2,095,672

UNITED STATES PATENT OFFICE 2,095,672

CAKE PLATE OF MOLDED FIBROUS MATERIAL

Paul C. Miller, Mt. Summit, Ind., assignor to Mapes Consolidated Manufacturing Company, Griffith, Ind., a corporation of Delaware Application March 20, 1936, Serial No. 69,895

13 Claims. (Cl. 65—15)

This invention relates to improvements in cake plates of molded fibrous material and it consists of the matters hereinafter described and more particularly pointed out in the appended claims.

In many baking establishments, particularly those which specialize in baking cakes, the cakes are removed from the baking pans and placed upon supporting plates of molded fibrous material. The cakes, so placed upon said plates, may not have entirely lost the heat imparted thereto during the baking operation.

Cake plates of molded pulp, generally are preferable to those pressed from sheet paper, for several reasons. However, such molded plates, under certain conditions, are open to objections which it is the purpose of the present invention to overcome.

In cakes having a fat content, it is believed that there is a reaction which results in the generation of vapors. It has been found that a cake plate of molded fibrous pulp material, due to the character of the material from which it is made, has the property of absorbing moisture from the vapors generated by the cake placed thereon.

In molded cake plates as heretofore made, such vapors are trapped between the cake and plate with the result that they must be absorbed by the plate. The vapors thus absorbed by the plate tend to moisten the plate with the result that there is an absorption by the cake of a pulpy flavor from the cake plate, thus objectionably affecting the taste or flavor of the cake.

When an icing is applied to the cake so as to cover the top and sides thereof, which is frequently done, it is apparent that icing seals the cake so as to prevent the escape of vapor from the top and sides. Hence, such vapors must pass off through the bottom and this increases the absorption effect between the cake and plate.

One of the objects of the present invention is to provide a cake plate of molded fibrous material upon which a cake, even though but recently removed from its baking pan, may be placed for cooling and future handling and which plate is so constructed as to properly vent the vapors from beneath the cake so as to prevent the trapping and condensing of such vapors between the cake and plate and eliminate the objections above mentioned.

Another object of the invention is to provide a cake plate of molded fibrous material which is substantially flat throughout its major portion but has other portions formed as hollow projections on its bottom, arranged to communicate with each other and to open through the peripheral margin of the plate so as to permit a circulation through said hollow projections for a venting or escape to atmosphere of vapors when the tops of said projections are covered by the cake engaged upon said flat major portion of the plate.

Another object of the invention is to provide a plate of this kind, which though light in weight, is strong and rigid; which is braced against warpage in production, and which nests with others for stacking in compact bundles or packages.

The above mentioned objects of the invention, as well as others, together with the several advantages thereof will more fully appear as I proceed with my specification.

In the drawing:

Fig. 1 is a vertical sectional view through a cake plate of molded fibrous material, embodying the preferred form of the invention and illustrates a cake in position thereon.

Fig. 2 is a top plan view of the cake plate on an enlarged scale.

Fig. 3 is a vertical sectional view through the cake plate shown in and on the scale of Fig. 2, the plane of the section being indicated by the line 3—3 of Fig. 2.

Fig. 4 is a detail fragmentary view in side elevation of a part of the cake plate at the outer end of one of the hollow projections thereof.

Referring now in detail to that embodiment of the invention, illustrated in the accompanying drawing, the cake plate herein is preferably die-molded from a suitable pulp solution of wet laid fibre by methods and on machines which are now conventional. The plate may be made in any one of a number of different shapes. As shown herein, it takes the form of a round or circular sheet including a number of arcuately spaced, flat sector-like portions 6, all disposed in the same horizontal plane. These flat sector-like portions are spaced apart by means of similarly shaped hollow projections 7 extending from one side of the sheet. The flat portions 6 collectively make up the major area of the sheet and form the cake supporting portion thereof. The hollow projections 7 collectively make up the minor area of the sheet and form the greater part of the vapor-dissipating portion of the sheet.

Centrally in the sheet is a circular hollow projection or depression 8, arranged on the same side of the sheet as the projections 7. This depression 8 has a flat bottom wall 9 and an upwardly and outwardly flaring side wall 10. The inner ends of all of the hollow projections 7 open into said depression to provide communication therewith and with each other.

Each hollow projection 7 includes a flat bottom 11 and upwardly and outwardly flaring side walls 12—12 respectively. The flat bottom of each projection 7 is disposed in the plane of and merges into the bottom wall of the depression. The side walls 12—12 of the hollow projections extend substantially radially with respect to the center of the depression which is also the center of the sheet and terminate at the side wall of said depression.

It is pointed out that there is an odd number of sector-like portions 6 and likewise the same odd number of projections 7 with said portions and projections arranged alternately. With this arrangement, there is a flat portion 6 radially opposite a hollow projection 7 as best appears in Fig. 2. This arrangement of said portions and projections greatly increases the strength of the plate.

The outer end of each hollow projection is formed by an upwardly and outwardly inclined wall 13 spaced radially inward from the plane of the peripheral edge of the plate. This wall merges into a downwardly curved flange 14, the lateral ends of which merge into the sides of adjacent flat portions 6. This flange defines a passage 15 which communicates with the interior of its associated hollow projection and provides inverted arches which in connection with the associated wall 13, connect the ends of adjacent portions 6 together so as to rigidify the plate at these points.

As before stated, the flat sector-like portions 6 collectively make up the major area of the plate. To prevent warpage of these portions in the production of the plate, as well as to increase communication between the projections 7 for the better venting of the vapors, the flat portions 6 are each provided with projections 6a—6a, arranged on the same side of the plate as the projections 7. These projections which are of a depth less than the projections 7—7, form arcuate grooves in the top surface of the plate which are concentric with the center of the plate with each groove opening at its ends through the side walls 12—12 of and into adjacent projections 7—7. By reasons of the projections 6a—6a the sector-like portions 6—6 are stiffened annularly as well as in a radial direction so that said portions remain flat and do not warp out of shape during the production of the plate.

The upward and outward flare of the side walls of the depression and the side and end walls of the hollow projection is of such an angle or angles as to permit a close nesting of the plates for packing.

In Fig. 1, I have shown a cake 16 arranged on the plate and this cake is illustrated as having an icing 17 thereon. Such a cake when first removed from its pan will be quite warm. The cake so disposed upon the plate will have areas of support upon the flat portions 6 and will span not only the center depression 8 but will also span the hollow projections 6a—6a and 7 to cover the same.

As previously stated, a vapor is generated particularly in cakes having a fat content, which if not vented to atmosphere as fast as it is produced, is condensed as moisture. However, as all of the projections open at their inner ends into the central depression and open at their outer ends to atmosphere by means of the passages 15, and by reason of the projections 6a—6a there is an intercommunication between the several hollow projections and a communication between each projection and atmosphere. Thus a circulation is possible through the various hollow projections so that such vapor as is generated in the cake finds an outlet or escape to atmosphere. Therefore, condensation is reduced to a minimum so that little or no moisture can form between the cake and plate to make the cake bottom soggy or to be absorbed by the plate.

As the cake plate and cake bottom remain substantially dry the transfer of taste, which can only occur in the presence of moisture, is reduced to a minimum if not entirely eliminated.

The pulp mixture of which the plate is made need not be treated so as to be moisture-proof. This would entail extra cost in manufacture and as such plates are sold in vast numbers, the matter of cost is quite important. Again, such treatment might entail the use of material much more objectionable as to taste transfer. The pulp material, of which the plate is made, in itself does not possess much strength so that it is the disposition of the parts in the finished plate that must provide the requisite strength. Even though said parts are so disposed, should they absorb moisture, this would detract from the rigidity of the plate.

In the present instance, the hollow projections and the end flanges thereof coact in providing the necessary strength and rigidity and as the vapor generated is not retained for condensation and future absorption by the plate, the plate retains its strength in use.

Again, the cake remains in a better and more sanitary and saleable condition because of the bottom being relatively dry. Under such conditions those portions of the cake bottom covering the tops of the hollow projections remain in a drier condition and, therefore, will not sag into said hollow projections. Thus a substantial deformation of the cake is avoided.

While in describing the invention, I have referred in detail to the form, arrangement and construction of the parts of the plate, the same is to be considered only in an illustrative sense so that I do not wish to be limited thereto except as may be specifically set forth in the appended claims.

I claim as my invention:

1. A plate of the kind described comprising a sheet of fibrous material having a plurality of cake supporting and engaging portions and having other portions formed to provide a plurality of hollow sector-like projections extending from one side of the cake supporting and engaging portions, said hollow projections extending inwardly from the peripheral margin of the plate and vent openings being provided in the peripheral margin of the plate that open into the outer ends of said projections.

2. A plate of the kind described comprising a sheet of fibrous material substantially flat throughout its major portion and having other portions formed to provide a plurality of hollow sector-like projections extending from one side of the plane of said major portion, said hollow projections extending inwardly from the peripheral margin of the plate and vent openings being provided in the peripheral margin of the plate that open into the outer ends of said projections.

3. A plate of the kind described comprising a sheet of fibrous material substantially flat throughout its major portion and having other portions formed to provide a plurality of hollow sector-like projections extending from one side of the plane of said major portion, said hollow projections extending inwardly from the peripheral margin of the plate, the outer end part of certain of said projections opening through said margin of the plate and being of a depth different from that of another part of said projections.

4. A plate of the kind described comprising a sheet of fibrous material substantially flat throughout its major portion and having other portions formed to provide a plurality of hollow sector-like projections extending from one side of the plane of said major portion, said hollow projections extending inwardly from the peripheral margin of the plate, the outer end part of certain of said projections being of a less depth than the inner end and opening through said margin of the plate and being defined by a flange that merges at its sides into said margin.

5. A plate of the kind described comprising a sheet of fibrous material substantially flat throughout its major portion and having a centrally disposed depression extending from one side of the plate and having other portions formed to provide a plurality of hollow sector-like projections on the same side of the plate and extending from said depression outwardly toward the peripheral margin of the plate, the outer end of at least certain of said hollow projections being of a less depth than the inner end and opening through the peripheral margin of the plate.

6. A plate of the kind described comprising a sheet of fibrous material substantially flat throughout its major portion and having a centrally disposed depression extending from one side of the plate and having other portions formed to provide a plurality of hollow sector-like projections on the same side of the plate and extending from said depression outwardly toward the peripheral margin of the plate, the outer end of at least certain of said hollow projections being of a less depth than the inner end and opening through the peripheral margin of the plate and being defined by a flange that merges at its sides into said margin.

7. A plate of the kind described comprising a sheet of fibrous material substantially flat throughout its major portion and having a centrally disposed depression extending from one side of the plate and having other portions formed to provide a plurality of hollow sector-like projections on the same side of the plate and extending from said depression outwardly toward the peripheral margin of the plate, the outer end of at least certain of said hollow projections being of a less depth than the inner end and opening through the peripheral margin of the plate, the bottom of said centrally disposed depression and the bottoms of at least some of said certain hollow projections being disposed in the same plane.

8. A plate of the kind described comprising a sheet of fibrous material substantially flat throughout its major portion and having a centrally disposed depression extending from one side of the plate and having other portions formed as sector shaped hollow projections extending from the same side of the plate and communicating at their inner ends with said depression, the outer ends of at least certain of said projections opening below the peripheral margin of the plate.

9. A plate of the kind described comprising a sheet of fibrous material substantially flat throughout its major portion and having a centrally disposed depression extending from one side of the plate and having other portions formed as sector shaped hollow projections extending from the same side of the plate and communicating at their inner ends with said depression, the outer ends of at least certain of said projections being provided with vents.

10. A plate of the kind described comprising a sheet of fibrous material substantially flat throughout its major portion and having a centrally disposed depression extending from one side of the plate and having other portions formed as sector shaped hollow projections extending from the same side of the plate and communicating at their inner ends with said depression, the outer ends of at least certain of said projections opening below the peripheral margin of the plate, and being defined by a flange that merges at its ends into said margin.

11. A plate of the kind described comprising a sheet of fibrous material substantially flat throughout its major portion and having a centrally disposed depression extending from one side of the plate and having other portions formed as sector shaped hollow projections extending from the same side of the plate and communicating at their inner ends with said depression, the outer ends of at least certain of said projections opening below the peripheral margin of the plate, the bottom of said centrally disposed depression and the bottom of at least some of said hollow projections being disposed in the same plane.

12. A plate of the kind described comprising a sheet of fibrous material having a plurality of cake supporting and engaging portions and having other portions formed to provide a plurality of hollow sector-like projections extending from one side of the cake supporting and engaging portions, said hollow projections extending inwardly from the peripheral margin of the plate where they are of lesser depth to there form vent openings, there being other hollow projections extending from said one side of said cake supporting and engaging portions and connecting adjacent ones of said first mentioned hollow projections so as to afford lateral communication therebetween.

13. A plate of the kind described comprising a sheet of fibrous material substantially flat throughout its major portion and having other portions formed to provide a plurality of hollow sector-like projections extending from one side of the plane of said major portion, said hollow projections extending inwardly from the peripheral margin of the plate, and at least a part of certain of said projections opening through said margin of the plate, and being of a less depth than other parts of said certain projections there being other hollow projections extending from said one side of said substantially flat major portion to rigidify the same and connect adjacent ones of said first mentioned hollow projections so as to afford lateral communication therebetween.

PAUL C. MILLER.